(12) United States Patent
Pham et al.

(10) Patent No.: US 9,929,789 B2
(45) Date of Patent: Mar. 27, 2018

(54) METHOD AND SYSTEM FOR MU-MIMO COMMUNICATION (71) Applicant: NEC Corporation, Minato-ku, Tokyo (JP)

(72) Inventors: Duong Pham, Mulgrave (AU); Yasushi Maruta, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/312,238

(22) PCT Filed: Mar. 19, 2015

(86) PCT No.: PCT/JP2015/059282
§ 371 (c)(1),
(2) Date: Nov. 18, 2016

(87) PCT Pub. No.: WO2015/194228
PCT Pub. Date: Dec. 23, 2015

(65) Prior Publication Data
US 2017/0085309 A1  Mar. 23, 2017

(30) Foreign Application Priority Data

Jun. 16, 2014  (AU) ................................ 2014902280

(51) Int. Cl.
H04B 7/06 (2006.01)
H04B 7/0452 (2017.01)
(Continued)

(52) U.S. Cl.
CPC ......... H04B 7/0639 (2013.01); H04B 7/0452 (2013.01); H04B 7/0478 (2013.01);
(Continued)

(58) Field of Classification Search
CPC .. H04B 7/0639; H04B 7/0626; H04B 7/0486; H04B 7/0452; H04B 7/0478; H04W 88/08; H04W 88/02
See application file for complete search history.

(56) References Cited

U.S. PATENT DOCUMENTS

2011/0085610 A1  4/2011 Zhuang et al.
2011/0135033 A1  6/2011 Ko et al.
(Continued)

FOREIGN PATENT DOCUMENTS

CN  101854234 A  10/2010

OTHER PUBLICATIONS

3rd Generation Partnership Project; Technical Specification Group Radio Access Network; Intel Corporation, "Further details of 3D/FD MIMO scenarios and antenna models", 3GPP TSG-RAN WG1 #72bis R1-130921, Chicago, USA, Apr. 15-19, 2013, pp. 1-7.
(Continued)

Primary Examiner — Vineeta Panwalkar (57) ABSTRACT

A method and system for data communication in a Multiple-Input and Multiple-Output (MIMO) system is provided. The method includes receiving, from a first UE, first channel information relating to a first subset of a plurality of antennae of the MIMO system and second channel information relating to a second subset of a plurality of antennae. The method further includes generating first and second sub-precoders according to the first and second channel information, respectively. A precoder is then generated according at least in part to the first sub-precoder and the second sub-precoder, and data is transmitted to the first UE using the precoder.

19 Claims, 7 Drawing Sheets (51) Int. Cl.
 H04B 7/04 (2017.01)
 H04W 88/02 (2009.01)
 H04W 88/08 (2009.01)
(52) U.S. Cl.
 CPC ......... H04B 7/0486 (2013.01); H04B 7/0626 (2013.01); *H04W 88/02* (2013.01); *H04W 88/08* (2013.01)

(56) References Cited

U.S. PATENT DOCUMENTS

2011/0274188 A1 11/2011 Sayana et al.
2012/0087265 A1 4/2012 Tamaki et al.
2014/0119466 A1* 5/2014 Kim ..................... H04L 1/0687
 375/267

OTHER PUBLICATIONS

International Search Report for PCT Application No. PCT/JP2015/059282, dated Jun. 23, 2015.
Written Opinion of the International Search Authority for PCT Application No. PCT/JP2015/059282.
Extended European Search Report for EP Application No. EP15810077.6 dated Dec. 11, 2017.

* cited by examiner

METHOD AND SYSTEM FOR MU-MIMO COMMUNICATION

This application is a National Stage Entry of PCT/JP2015/059282 filed on Mar. 19, 2015, which claims priority from Australian Patent Application 2014902280 filed on Jun. 16, 2014, the contents of all of which are incorporated herein by reference, in their entirety.

TECHNICAL FIELD

The present invention relates to control signalling in advanced wireless communication networks. In particular, although not exclusively, the invention relates to generation of precoders in MIMO (Multiple-Input and Multiple-Output) systems.

BACKGROUND ART

The following table contains certain abbreviations/acronyms that may be found herein:

TABLE 1

| | |
|---|---|
| CI | Channel Information |
| DL | Downlink |
| eNodeB/eNB | E-UTRAN Node B or evolved Node B |
| E-UTRAN | Evolved Universal Terrestrial Radio Access Network |
| MIMO | Multiple-Input and Multiple-Output |
| MU-MIMO | Multi-user Multiple-Input and Multiple-Output |
| OFDM | Orthogonal frequency division multiplexing |
| OFDMA | Orthogonal frequency division multiple access |
| PMI | Precoding matrix indicators |
| SU-MIMO | Single user MIMO |
| TxAn | Transmit antenna |
| UE | User Equipment |

Wireless communication systems are widely known in which base stations (also known as E-UTRAN Node Bs (eNBs)) communicate with mobile devices (also known as user equipments (UEs)) which are within range of the eNB. Each eNB divides its available bandwidth, i.e. frequency and time resources, into different resource allocations for the different UEs. There is a constant need to increase the capacity of such systems, and to improve the efficiency of resource utilization, in order to accommodate more users (more UEs), more data-intensive services and/or higher data transmission rates.

OFDM (Orthogonal Frequency Division Multiplexing) is one technique used for transmitting data in wireless communication systems. An OFDM-based communications scheme divides data symbols to be transmitted among a large number of subcarriers; hence the term "frequency division multiplexing". Data is modulated onto a subcarrier by adjusting its phase, amplitude, or both phase and amplitude. The "orthogonal" part of the name OFDM refers to the fact that the spacings of the subcarriers in the frequency domain are chosen so as to be orthogonal, in a mathematical sense, to the other subcarriers. In other words, they are arranged in the frequency domain such that the sidebands of adjacent subcarriers may overlap but such that inter-subcarrier interference is sufficiently minimized for the subcarriers to be received.

When individual subcarriers or sets of subcarriers are assigned to different users (different UEs), the result is a multi-access system referred to as OFDMA (Orthogonal Frequency Division Multiple Access). The term OFDM is often intended to include the term OFDMA. The two terms may therefore be considered interchangeable for the purposes of the present explanation. By assigning distinct frequency/time resources to each UE in a cell, OFDMA can help to avoid interference among UEs within a given cell.

A further modification of the basic OFDM scheme is called MIMO which stands for "multiple-input multiple-output". This type of scheme employs multiple antennae at the transmitter and/or at the receiver (often at both) to enhance the data capacity achievable between the transmitter and the receiver. Typically, this is used to achieve enhanced data capacity between an eNB and the user equipment(s) (UE(s)) served by that eNB.

By way of example, a 2×2 "single user MIMO" (SU-MIMO) configuration contains two antennae at the transmitter and two antennae at a single receiver that is in communication with the transmitter. Likewise, a 4×4 SU-MIMO configuration contains four antennae at the transmitter and four antennae at the single receiver that is in communication with the transmitter. There is no need for the transmitter and receiver to employ the same number of antennae. Typically, an eNB in a wireless communication system will be equipped with more antennae in comparison with a UE, owing to differences in power, cost and size limitations. It should also be noted that so called "multi-user MIMO" (MU-MIMO) is often employed, and this involves a single eNB which is able to perform MIMO communication with multiple UEs at once. This is discussed further below.

The term "channel" is commonly used to refer to the frequency (or equivalent time delay) response of the radio link between a transmitter and a receiver. The MIMO channel (hereafter simply the "channel") contains all the subcarriers (see the discussion on subcarriers above), and covers the whole bandwidth of transmission. A MIMO channel contains many individual radio links. The number of these individual radio links, which may each be individually referred to as a single-input single-output (SISO) channel, is $N_{RX} \times N_{TX}$, where $N_{TX}$ is the number of antennae at the transmitter and $N_{RX}$ is the number of antennae at the receiver(s). For example, as a 3×2 SU-MIMO arrangement contains 6 links, it has 6 SISO channels.

Figure 1:
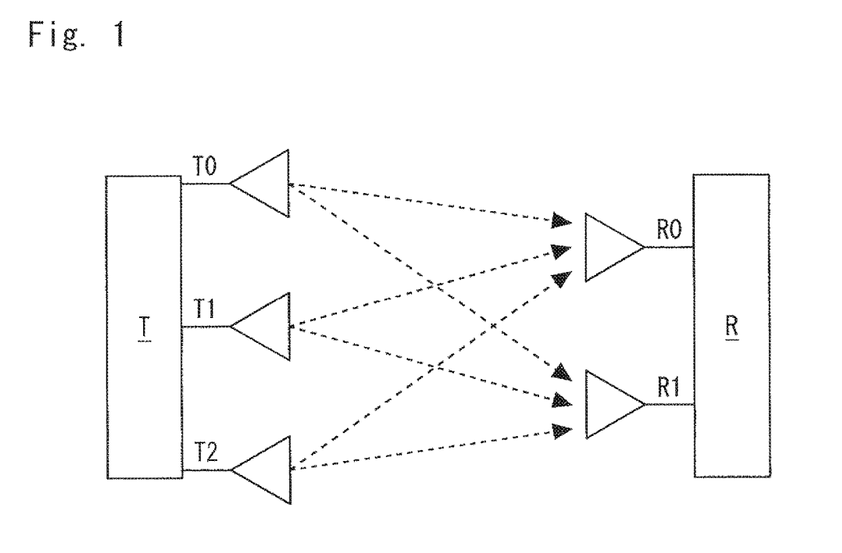
FIG. 1 schematically illustrates a simplified 2×3 SU-MIMO system.

Considering the simplified 2×3 SU-MIMO system schematically represented in FIG. 1, it can be seen that a receiver antenna R0 of receiver R receives transmissions from each of the transmitter antennae T0, T1 and T2 of transmitter T. Similarly, a receiver antenna R1 receives transmissions from transmitter antennae T0, T1 and T2. Therefore, the signal received at the receiver comprises (or is made up of) a combination of the transmissions (i.e. a combination of the six SISO channels) from the transmitter antennae. In general, SISO channels can be combined in various ways to transmit one or more data streams to the receiver.

Figure 2:
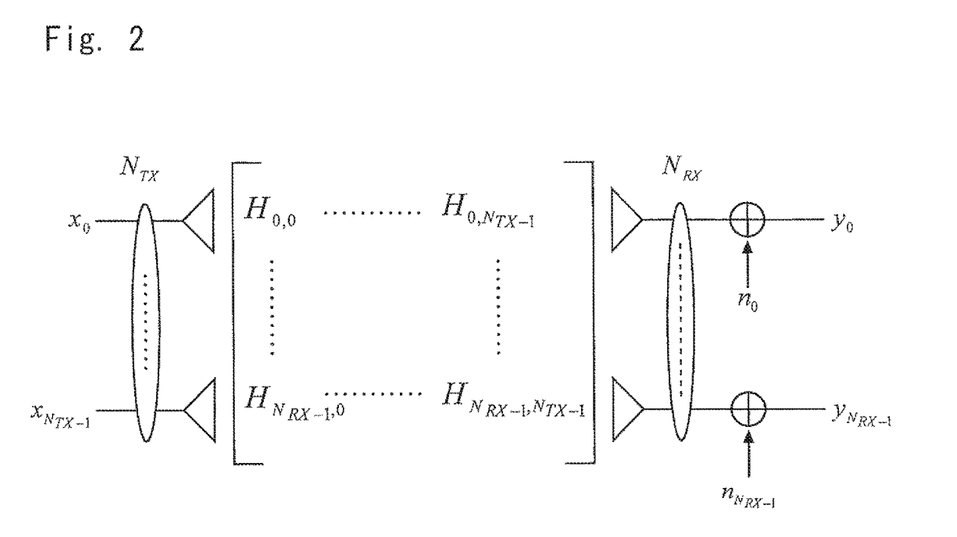
FIG. 2 is a conceptual diagram of a more generalized SU-MIMO system.

FIG. 2 is a conceptual diagram of a more generalized SU-MIMO system. In FIG. 2, a transmitter transmits signals utilizing $N_{TX}$ transmitting antennae, and a single receiver receives the signals from the transmitter utilizing $N_{RX}$ receiving antennae. In order to create a mathematical model of the characteristics of the overall MIMO channel (in this case a SU-MIMO channel), it is necessary to represent the individual SISO channels between the transmitter and receiver. As shown in FIG. 2, the individual SISO channels are represented by $H_{0,0}$ to $H_{N_{RX-s},N_{TX-s}}$; and as suggested in the Figure, these form terms of a matrix commonly called the "channel matrix" or channel response matrix H. It will be recognized that $H_{0,0}$ represents the channel characteristics (for example, channel frequency response) for transmitting signals from transmitting antenna 0 to receiving antenna 0.

Similarly, "$H_{N_{RX-1},N_{TX-1}}$" represents the channel characteristics for transmitting signals from the transmitting antenna $N_{TX-1}$ to the receiving antenna $N_{RX-1}$, and so on.

In FIG. 2, the symbols $x_0$ to $x_{N_{TX-1}}$, which represent the signal elements transmitted using the transmitting antennae 0 to $N_{TX-1}$ together form a transmitted signal vector $x=(x_0, x_1, \ldots, x_{N_{TX-1}})^T$, where $(\ )^T$ indicates the vector transpose. Likewise, the received signals elements $y_0$ to $y_{N_{RX-1}}$ received by receiving antennae 0 to $N_{RX-1}$ together form received signal vector $y=(y_0, y_1, \ldots, y_{N_{RX-s}})^T$. The relationship between the vectors y and x for the simplified single user system shown in FIG. 2 may be modelled by the basic MIMO system equation:

$$y = Hx + n \quad \text{(Equation 0)}$$

where H is the channel matrix referred to above and n is a vector representing noise (usually assumed to be additive white Gaussian noise).

It should be noted at this point that FIG. 1 and FIG. 2 (discussed above) both relate to "single user" MIMO (SU-MIMO) systems. However, as also mentioned above, so called "multi-user" MIMO (MU-MIMO) is often employed, and this involves a single eNB having multiple antennae which is able to perform MIMO communication with multiple UEs (each of which may also have multiple antennae) at once. In particular, in MU-MIMO the eNB transmits data to different UEs on the same time-frequency from multiple transmit antennae. To minimize interference between UEs, the eNB creates transmission beams through precoding.

According to Wikipedia for example, "precoding" is a generalization of "beamforming" and is used to support multi-stream (or multi-layer) transmission in multi-antenna wireless communications. In conventional single-stream beamforming, the same signal is emitted from each of the transmit antennae with appropriate weighting (phase and gain) such that the signal power is maximized at the receiver. When the receiver has multiple antennae, however, single-stream beamforming cannot simultaneously maximize the signal level at all of the receiver antennae. In order to maximize the throughput in multiple receiver antenna systems, multi-stream transmission is generally required.

In multi-user MIMO (MU-MIMO), a multi-antenna transmitter communicates simultaneously with multiple receivers (each having one or multiple antennae), as explained above. From an implementation perspective, precoding algorithms for MU-MIMO systems are classified into linear and non-linear precoding types. The capacity achieving algorithms are generally nonlinear, but linear precoding approaches may still achieve a reasonable performance with much lower complexity. Linear precoding strategies include, for example, maximum ratio transmission (MRT), zero-forcing (ZF) precoding, and transmit Wiener precoding.

While performance maximization has a clear interpretation in point-to-point MIMO, a multi-user system generally cannot simultaneously maximize the performance for all users. Multi-user systems may therefore be said to involve a multi-objective optimization problem where each objective corresponds to maximization of the capacity of one of the users.

In any case, at the receiving side, a UE uses postcoding (decoding) to obtain its data.

Those skilled in the art will appreciate from the discussion above that precoding is often highly dependent on the state of the channel (i.e. it is dependent on the "channel state"—see below).

Mathematically, a MU-MIMO system can be described (modelled) by modifying the simplified single user MIMO system equation (Equation 0) above as follows:

$$y(i) = H(i)V(i)x(i) + \sum_{k=1,k\neq i}^{N_{UE}} H(i)V(k)x(k) + n(i) \quad \text{(Equation 1)}$$

In Equation 1 above:
y(i) is the received signal at the i-th UE,
x(i) is the data signal for the i-th UE,
H(i) is the channel matrix for the i-th UE,
V(i) is the precoder matrix of the i-th UE,
n(i) is the additive white Gaussian noise at the i-th user.

MIMO transmission schemes may be said to be either "non-adaptive" or "adaptive". In the non-adaptive case, the transmitter does not have any knowledge of the condition or properties of the channel. In other words, the transmitter does not have any knowledge of the way a transmitted signal changes as it is transmitted "through the air". This lack of knowledge regarding the "channel state" can limit performance as the transmitter cannot take account of, for example, changes in conditions which cause changes in the state or properties of the channel (which affect how a transmitted signal changes "in the air"). Adaptive schemes rely on the feedback of information (so-called "channel-state information" or CSI) from the receiver to the transmitter (i.e. in the uplink (UL)), which allows modification of transmitted downlink (DL) signals to account for changing conditions (i.e. to account for the changing channel state) and to maximize data throughput. In other words, the feedback of CSI can be used to facilitate or assist with precoding. The present invention is concerned primarily with these adaptive types of MIMO schemes.

A problem with MIMO systems of the prior art is that they are generally computationally complex.

It is to be clearly understood that mere reference herein to previous or existing devices, apparatus, products, systems, methods, practices, publications or to any other information, or to any problems or issues, does not constitute an acknowledgement or admission that any of those things, whether individually or in any combination, formed part of the common general knowledge of those skilled in the field, or that they are admissible prior art.

SUMMARY OF INVENTION

Technical Problem

The present invention is directed to data communication in advanced wireless communication networks, which may at least overcome at least one of the abovementioned disadvantages or provide the consumer with a useful or commercial choice.

Solution to Problem

With the foregoing in view, the present invention in one form, resides broadly in a method of data communication in a Multiple-Input and Multiple-Output (MIMO) system, the MIMO system including a base station comprising a plurality of antennae, and a plurality of user equipments (UEs), the method including:

receiving, from a first UE of the plurality of UEs, first channel information relating to a first subset of the plurality of antennae;

generating a first sub-precoder according to the first channel information;

receiving, from the first UE, second channel information relating to a second subset of the plurality of antennae;

generating a second sub-precoder according to the second channel information;

generating a precoder according at least in part to the first sub-precoder and the second sub-precoder; and transmitting data to the first UE using the precoder.

Preferably, the first and second channel information comprises pre-coding matrix indicators (PMI).

Preferably, the MIMO system comprises a Multi-user Multiple-Input and Multiple-Output (MU-MIMO) system.

The antennae may be partitioned into a plurality of subsets, wherein the plurality of subsets includes the first subset and the second subset.

The method may further include: determining one or more representative sub-channels for the first UE according to at least the first and second channel information; and generating a sub-precoder for each of the one or more representative sub-channels.

The representative sub-channels may be determined according to a rank indicator (RI) of the first UE. For example, the representative sub-channels $\hat{H}_i$ may be determined according to the following equation.

$\hat{H}_i = \hat{H}(m^*) \in \Omega_{RI}$, $i=1, \ldots, N_{UE}$ where $$m^* = \underset{m}{\operatorname{argmax}} tr\{[\hat{H}(n)W_i]^H [\hat{H}(m)W_i]\},$$

$\hat{H}(m) \in \Omega_{RI}$ and $\Omega_{RI}$ contains matrices $\hat{H}(m)$, $m=1, \ldots$ of size $N_{RX} \times \mu_{TX}$, and $W_i$ denotes the codebook precoder corresponding to a reported PMI, when the rank of the first UE is equal to a number of receiver antennae of the first UE. Alternatively, the representative sub-channels may be determined by calculating correlation values for a plurality of sub-channels, and selecting the representative sub-channels based upon the correlation values.

The method may further comprise determining a sub-transmit-power of the first UE, and determining the sub-precoders associated with the first UE according to sub-transmit power.

The sub-precoders may be generated using joint transmit and receive optimization according to at least the first and second channel information. In particular, the sub-precoders $F_{i(m)}$ may be generated iteratively over m according to the following equation.

$$F_{i(m+1)} = \left[ \sum_{i=1}^{N_{UE}} H_i^H G_{i(m)}^H G_{i(m)} H_i + v_{(m)} I \right]^{-1} H_i^H G_{i(m)}^H,$$

where $G_{i(m)}$ is the decoder of the i-th user, H(i) is a channel matrix, I is the identity matrix, and $v_{(m)}$ is a Lagrangian multiplier.

The Lagrangian multiplier $v_{(m)}$ may be calculated by:

a) Computing $\lambda_{n_{TX}(m+1)}$ as the singular values of the following decomposition:

$$U_{(m+1)} \Lambda_{(m+1)} U_{(m+1)} = \sum_{i=1}^{U_E} H_i^H G_{i(m+1)}^H G_{i(m+1)} H_i;$$

b) Setting $v_{(m+1)} = (v_{max} + v_{min})/2$;

c) Computing the following quantity $$\hat{\beta} = \sum_{n_{TX}=1}^{\mu_{TX}} \frac{\lambda_{n_{TX}(m+1)}}{(\lambda_{n_{TX}(m+1)} + v_{(m+1)})^2}$$

d) determining if $\hat{\beta} > \beta$ then set $v_{min} = v_{(m+1)}$ otherwise set $v_{max} = v_{(m+1)}$; and e) Repeating steps b), c) and d) until $|\hat{\beta} - \beta| < \epsilon_L$.

The method may further comprise estimating a noise variance for the first UE, and generating the sub-precoders according to the noise variance.

The noise variance $\sigma_i^2$ may be determined according to the following equation.

$$\sigma_i^2 = \frac{P/N_{UE}}{\sum_{i=1}^{L_i} SINR_{il}/L_i},$$

$i=1, \ldots, N_{UE}$ where $L_i$ is the number of code words used for the i-th UE, P is the transmit power, and $SINR_{il}$ is the signal-to-interference-plus-noise ratio.

The precoder may be generated by stacking the sub-precoders.

The plurality of antennae may comprise a 4×4 array of antennae. The 4×4 array of antennae may be partitioned into four (4) subsets of four (4) antennae.

The method may further include:

receiving, from a second UE of the plurality of UEs, third channel information relating to the first subset of the plurality of antennae;

generating a third sub-precoder according to the third channel information;

receiving, from the second UE, fourth channel information relating to a second subset of the plurality of antennae;

generating a fourth sub-precoder according to the second channel information;

generating a second precoder according at least in part to the third sub-precoder and the fourth sub-precoder; and transmitting second data to the second UE using the second precoder.

The second data may be transmitted to the second UE simultaneously with the data being transmitted to the first UE.

In another form, the present invention resides broadly in a MIMO base station comprising a plurality of antennae, the base station including a processor and instruction code executable by the processor for:

receiving, from a first UE of the plurality of UEs, first channel information relating to a first subset of the plurality of antennae;

generating a first sub-precoder according to the first channel information;

receiving, from the first UE, second channel information relating to a second subset of the plurality of antennae;

generating a second sub-precoder according to the second channel information;

generating a precoder according at least in part to the first sub-precoder and the second sub-precoder; and transmitting data to the first UE using the precoder.

Advantages of certain embodiments of the present invention include an ability to support a PMI reporting mechanism where an antenna set is partitioned into multiple subsets and multiple PMI reports are configured. As a result, performance may be improved when compared to methods of the prior art.

Certain embodiments enable joint transmit and receive optimization without requiring complete knowledge of the channel, for example by using PMI feedback only, which may in turn reduce complexity.

Any of the features described herein can be combined in any combination with any one or more of the other features described herein within the scope of the invention.

Advantageous Effects of Invention

According to the present invention, it is possible to provide improved techniques for overcoming at least one of the abovementioned disadvantages or providing the consumer with a useful or commercial choice.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DESCRIPTION OF EMBODIMENTS

Figure 3:
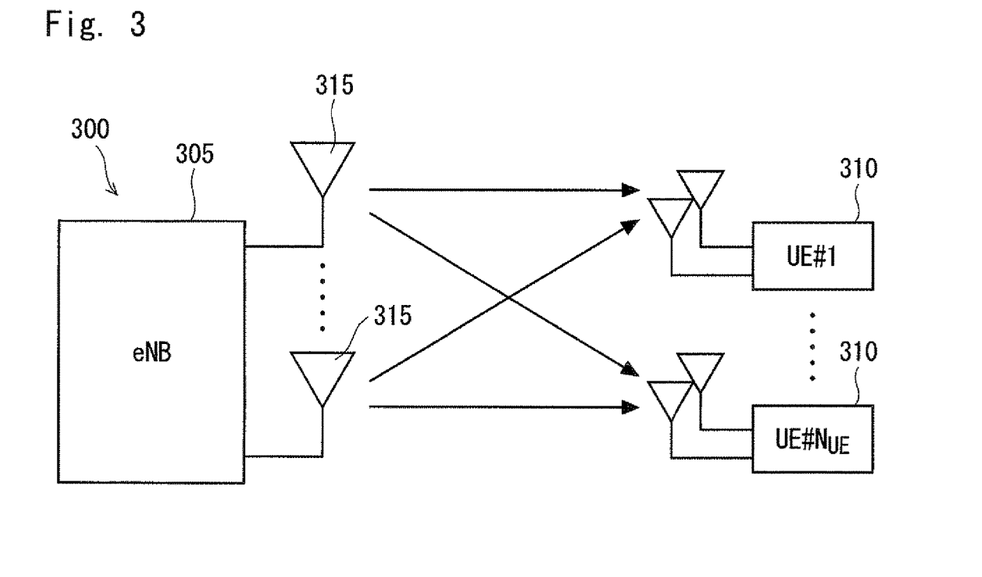
FIG. 3 is a schematic diagram illustrating a Multi-user Multiple-Input and Multiple-Output (MU-MIMO) wireless communication system, according to an embodiment of the present invention.

FIG. 3 is a schematic diagram illustrating a Multi-user Multiple-Input and Multiple-Output (MU-MIMO) wireless communication system 300, according to an embodiment of the present invention.

The MU-MIMO wireless communication system 300 includes a base station in the form of an E-UTRAN Node B (eNodeB) 305 and a plurality of User Equipments (UEs) 310. The eNodeB 305 includes a plurality of antennae 315 for MU-MIMO transmission of data. The wireless communication system 300 thus enables MU-MIMO transmission of data from the eNodeB 305 to the plurality of UEs 310, as discussed in further detail below.

Figure 4:
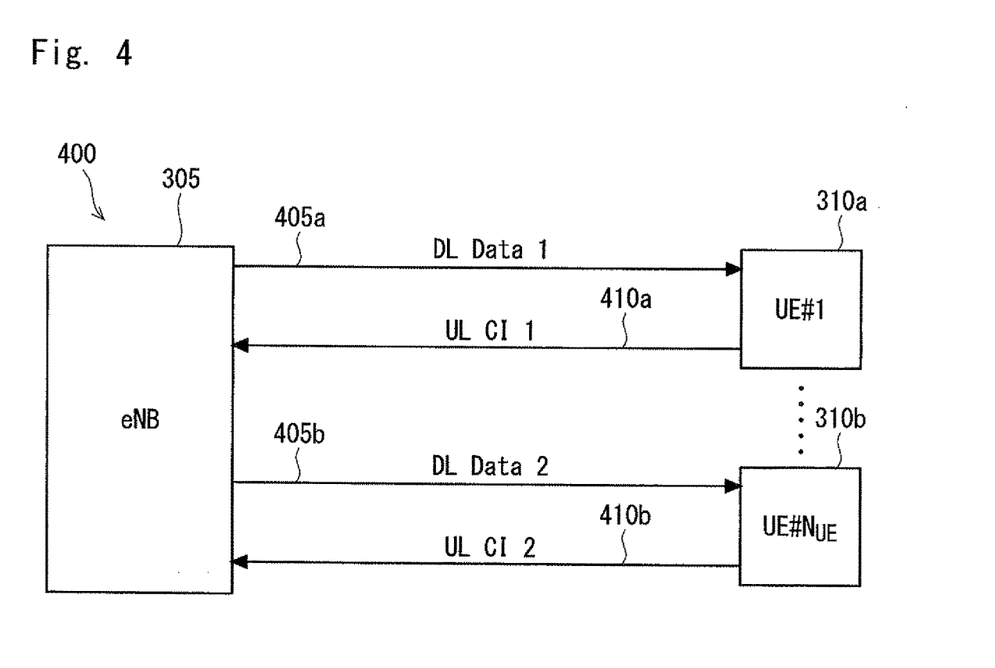
FIG. 4 illustrates a message flow diagram of the MU-MIMO wireless communication system of FIG. 3, according to an embodiment of the present invention.

FIG. 4 illustrates a message flow diagram 400 of the MU-MIMO wireless communication system 300, according to an embodiment of the present invention.

First downlink data is transmitted from the eNodeB 305 to a first UE 310a of the plurality of UEs 310, as illustrated by 405a (downlink (DL) data), and second downlink data is transmitted from the eNodeB 305 to a second UE 310b of the plurality of UEs 310, as illustrated by 405b (downlink (DL) data). Upon reception of the first data, the first UE 310a generates channel information (CI) in the form of a first set of precoding matrix indicators (PMIs). Similarly, the second UE 310b generates channel information in the form of a second set of PMIs.

The first set of PMIs is transmitted to the eNodeB 305 by the first UE 310a, as illustrated by 410a (uplink (UL) CI), and the second set of PMIs is transmitted to the eNodeB 305 by the second UE 310b, as illustrated by 410b (uplink (UL) CI). The eNodeB 305 uses the first and second sets of PMIs to generate precoders for the first and second UEs 310a, 310b respectively.

The feedback of the channel information (e.g. PMI) from the receiver to the transmitter enables the eNodeB 305 to modify downlink (DL) signals to account for changing conditions and to maximize data throughput, as discussed in further detail below. In particular, the UEs 310 search through codebooks of PMIs for a PMI that best represents the characteristics of the channel.

Figure 5:
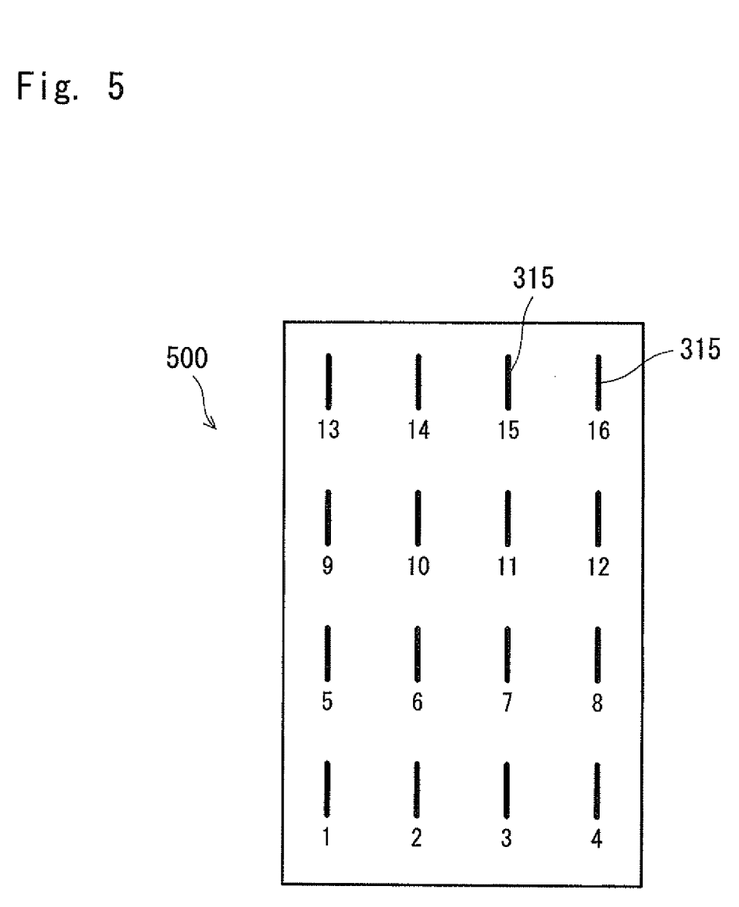
FIG. 5 illustrates a two-dimensional (2D) antenna array, according to an embodiment of the present invention.

The plurality of antennae 315 define a two-dimensional (2D) antenna array 500, as illustrated in FIG. 5, and according to an embodiment of the present invention. As the antenna array 500 is two-dimensional (i.e. 4×4 antennae), the corresponding communication channel becomes three-dimensional (3D).

Figure 6:
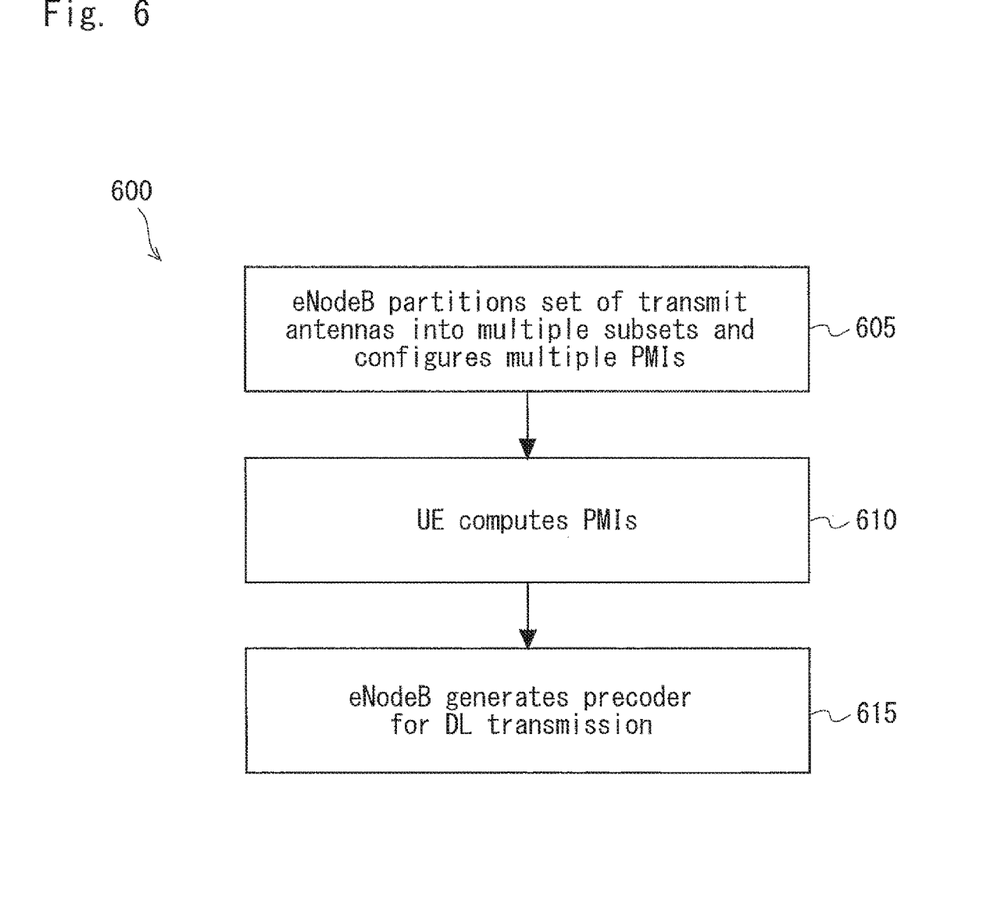
FIG. 6 illustrates a method of PMI reporting and precoder generation, for data communication in the MU-MIMO system of FIG. 3, according to an embodiment of the present invention.

FIG. 6 illustrates a method 600 of PMI reporting and precoder generation, for data communication in the MU-MIMO system 300, according to an embodiment of the present invention.

At step 605, the plurality of antennae 315 are partitioned into a plurality of subsets. Although the plurality of antennae are advantageously partitioned in the subsets at the eNodeB 305, they may, for example, be partitioned according to a predefined pattern.

Figure 7:
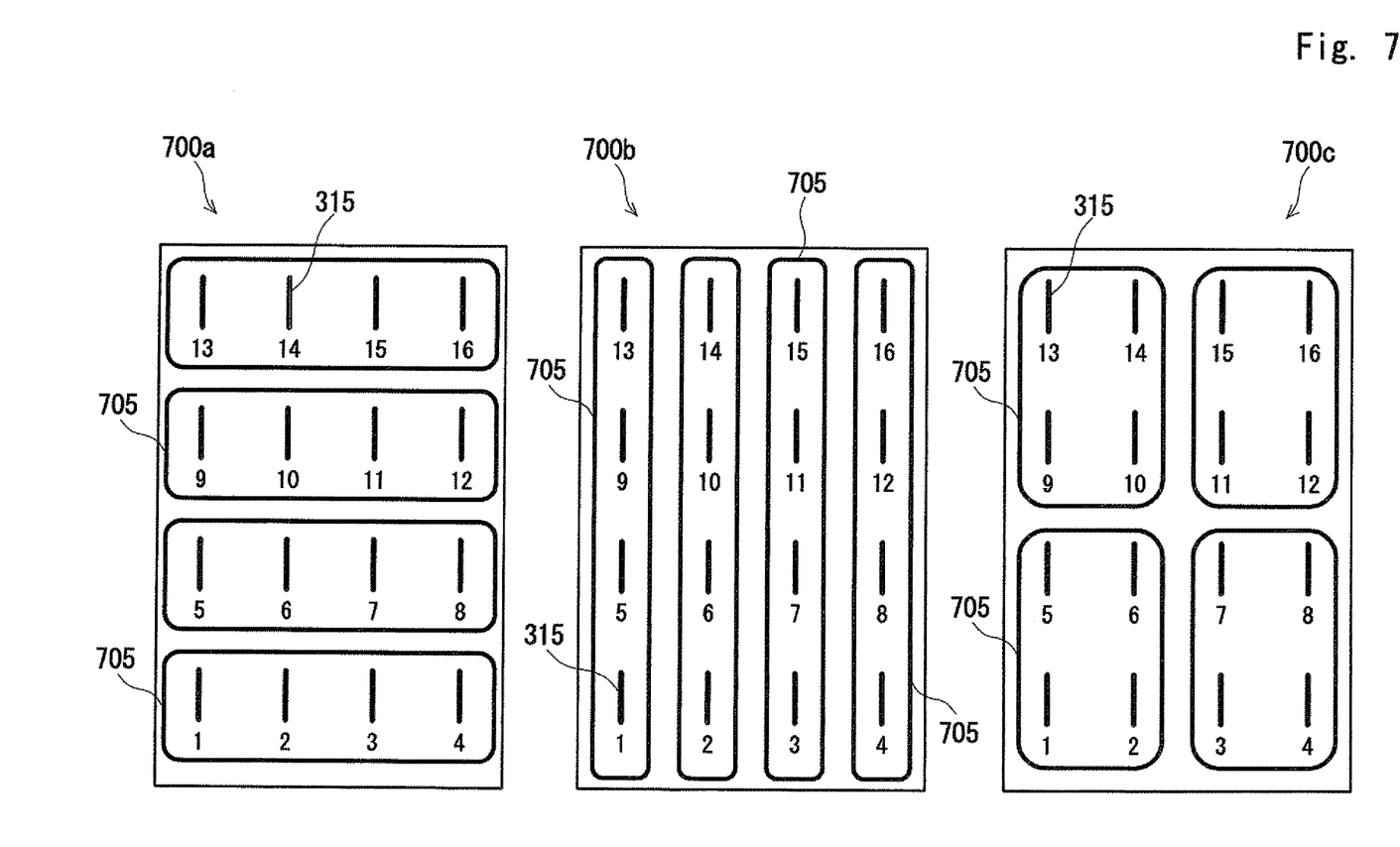
FIG. 7 illustrates example partitions of a plurality of antennae of the MU-MIMO system of FIG. 3, according to an embodiment of the present invention.

FIG. 7 illustrates example partitions 700a, 700b, and 700c of the plurality of antennae 315, according to an embodiment of the present invention. The antennae 315 are partitioned into a plurality of subsets 705. Each of the subsets 705 comprises four (4) antennae 315, and as such there are in total four (4) subsets 705 in each example partition 700a, 700b, 700c.

Referring back to FIG. 6, PMIs for each of the plurality of subsets are generated in 610. In particular, the first UE 310a will generate PMIs for at least a first subset and a second subset of the plurality of antennae 315. The person skilled in the art will readily appreciate that the antennae 315 can be partitioned into any number of suitable subsets.

The first UE 310a then searches through a codebook of PMIs for PMIs that best represent the characteristics of the subchannels, i.e. subchannels corresponding to each of the plurality of subsets. The PMIs are then provided to the eNodeB 305.

At step 615, a precoder is generated at the eNodeB, for later communication with the first UE 310a, as discussed below.

Figure 8:
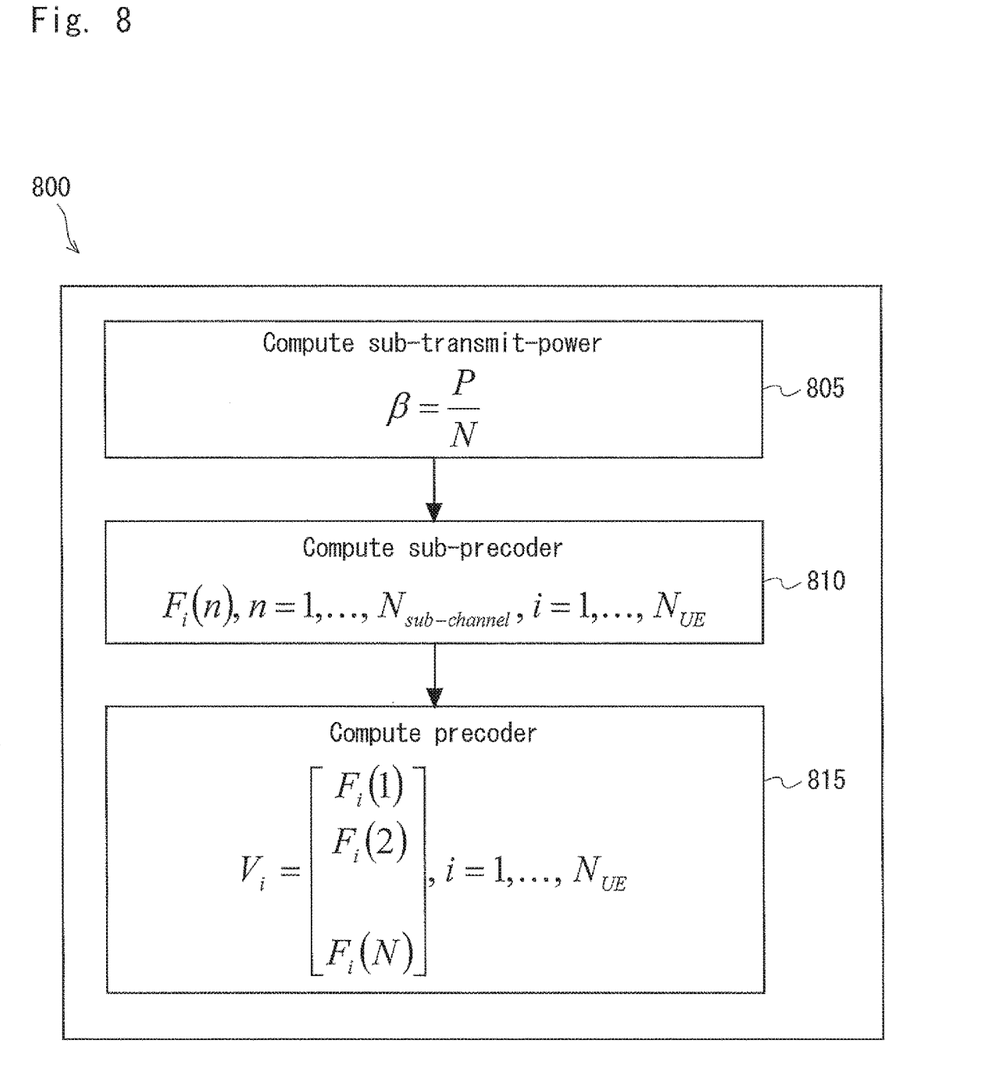
FIG. 8 illustrates a method of generating a precoder for a UE, according to an embodiment of the present invention.

FIG. 8 illustrates a method 800 of generating a precoder for a UE, according to an embodiment of the present invention. The method 800 can, for example, be used to generate the precoder at step 615 of the method 600.

At step 805, subtransmit power β of the UE is computed as follows:

$$\beta = \frac{P}{N} \quad \text{(Equation 2)}$$

where P is the transmit power of the eNode B, and N is the number of UEs.

At step 810, a sub-precoder $F_i(n)$, $n=1, \ldots, N_{sub-channel}$, $i=1, \ldots, N_{UE}$ is computed. In particular, representative sub-channels corresponding to the reported PMIs are computed, and sub-precoders are generated for each of the representative sub-channels.

The representative sub-channels for an antenna subset can be determined as described below.

Let $W_i$ denote the codebook precoder corresponding to the reported PMI of the i-th UE; let $\Omega_{RI}$ denote the fixed codebook of representative channel matrices which can be generated from the PMI codebook(s); and let $\hat{H}_i$ be the representative sub-channels for the channel $H_i$. There are different $\Omega_{RI}$ for different rank indicators (RI), as follows:

For RI=$N_{RX}$, the $\Omega_{RI}$ contains matrices $\hat{H}(m)$, $m=1, \ldots$ of size $N_{RX} \times \mu_{TX}$ For $RI_i < N_{RX}$, the $\Omega_{RI}$ contains vectors $\hat{h}(m)$, $m=1, \ldots$ of size $\mu_{TX} \times 1$ If $RI_i = N_{RX}$, $\hat{H}_i = \hat{H}(m^*) \in \Omega_{RI}$, $i = 1, \ldots, N_{UE}$ (Equation 3)

where $$m^* = \arg\max_m tr\{[\hat{H}(m)W_i]^H [\hat{H}(m)W_i]\}, \hat{H}(m) \in \Omega_{RI}$$

If $RI_i < N_{RX}$:
a) Calculate correlation values:

$$C_i(m) = tr\{[\hat{h}^H(m)W_i]^H[\hat{h}^H(m)W_i]\} m=1, \ldots \quad \text{(Equation 4)}$$

b) Sort to find the $N_{RX}$ largest correlation values $C_i(m_1) > C_i(m_2) > \ldots > C_i(m_{N_{RX}})$ and the $N_{RX}$ corresponding $\hat{h}(m_1)$, $\hat{h}(m_2), \ldots, \hat{h}(m_{N_{RX}})$ to form the channel matrix $$\hat{H}_i = [\hat{h}(m_1), \hat{h}(m_2), \ldots \hat{h}(m_{N_{RX}})]^H \quad \text{(Equation 5)}$$

Note if the PMI consists of PMI#1 and PMI#2 then $W_i = W_{i(1)} \times W_{i(2)}$.

At step 815, the precoder $V_i$ is computed by stacking the sub-precoders $F_i(n)$ as follows:

$$V_i = \begin{bmatrix} F_i(1) \\ F_i(2) \\ \vdots \\ F_i(N) \end{bmatrix}, i = 1, \ldots, N_{UE} \quad \text{(Equation 6)}$$

Figure 9:
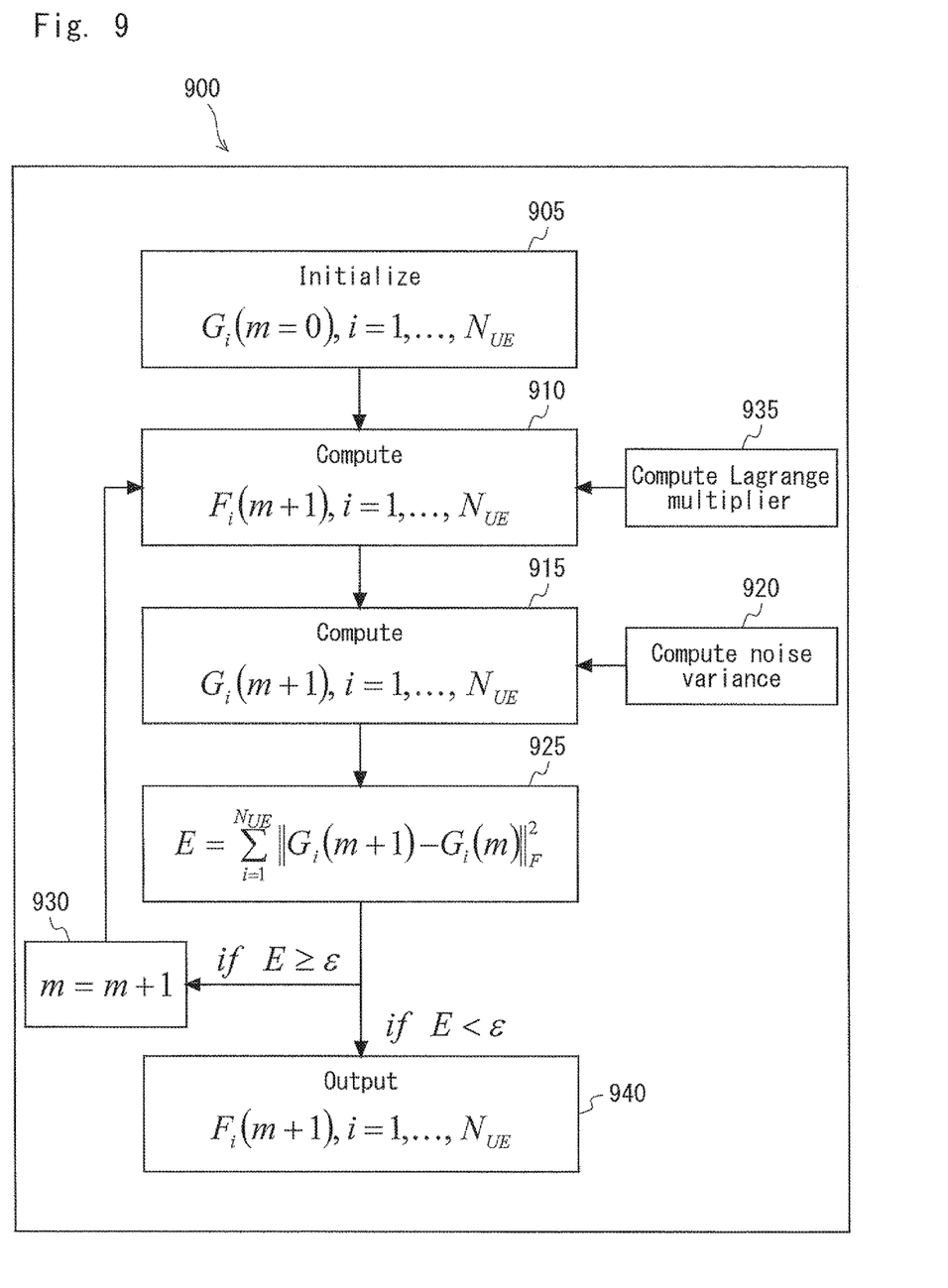
FIG. 9 illustrates a method of generating sub-precoders, according to an embodiment of the present invention.

FIG. 9 illustrates a method of generating sub-precoders, according to an embodiment of the present invention. The method 900 can be used to generate the sub-precoder at step 810 of the method 800. As described below, the method 900 is iterative, and m denotes the m-th iteration of the algorithm.

At block 905, the composite channel matrix $G_{i(m=0)}$ is initialized to $G_{i(m=0)} = J_i$, $i=1, \ldots, N_{UE}$, where $J_i$ is a $RI_i \times N_{RX}$ matrix with elements (a,b) being zero for $a \neq b$ and 1 for $a=b$.

Furthermore, the Lagrange multiplier $v_{(m=0)}$ is initialized to 1.

At step 910, precoders $F_{i(m+1)}$ are computed using the composite channel matrix $G_{i(m)}$ and the Lagrangian multipliers $v_{(m)}$ for $i=1, \ldots, N_{UE}$ as follows:

$$F_{i(m+1)} = \left[ \sum_{i=1}^{N_{UE}} H_i^H G_{i(m)}^H G_{i(m)} H_i + v_{(m)} I \right]^{-1} H_i^H G_{i(m)}^H \quad \text{(Equation 7)}$$

At step 915, the next composite channel matrix $G_{i(m+1)}$ is computed using the precoders $F_{i(m+1)}$ for $i=1, \ldots, N_{UE}$ as follows:

$$G_{i(m+1)} = F_{i(m+1)}^H H_i^H \left[ H_i \left( \sum_{i=1}^{N_{UE}} F_{i(m+1)} F_{i(m+1)}^H \right) H_i^H + \sigma_i^2 I \right]^{-1} \quad \text{(Equation 8)}$$

where $\sigma_i^2$ is a noise variance estimate.

According to certain embodiments, the noise variance estimate $\sigma_i^2$ is generated at step 920 based upon a reported CQI as follows:

1) Find Signal to Interference and Noise Ratio $SINR_{il}$ based on SINR thresholds in a CQI lookup table;
2) Calculate the noise variance estimate $\sigma_i^2$ using $SINR_{il}$ and the transmit power P as follows:

$$\sigma_i^2 = \frac{P/N_{UE}}{\sum_{l=1}^{L_i} SINR_{il}/L_i}, i = 1, \ldots, N_{UE} \quad \text{(Equation 9)}$$

where $L_i$ is the number of code words used for the i-th UE.

According to alternative embodiments to, for example, reduce complexity, the noise variance can be fixed to zero as follows:

$$\sigma_i^2 = 0, i=1, \ldots, N_{UE} \quad \text{(Equation 10)}$$

At step 925, a difference E between the current composite channel matrix $G_{i(m)}$ and the next composite channel matrix $G_{i(m+1)}$ is determined as follows:

$$E = \sum_{i=1}^{N_{UE}} \|G_{i(m+1)} - G_{i(m)}\|_F^2 \quad \text{(Equation 11)}$$

where $\|\cdot\|_F^2$ denotes Frobenius norm.

Steps 910, 915, 925 and 930 are repeated until the difference E is less than a threshold ε. In particular, m is incremented at step 930, and new Lagrange multipliers $v_{(m+1)}$ are calculated at step 935.

The new Lagrange multipliers $v_{(m+1)}$ can be calculated as follows:
a) Compute $\lambda_{n_{TX}(m+1)}$ as the singular values of the following decomposition:

$$U_{(m+1)} \Lambda_{(m+1)} U_{(m+1)} = \sum_{i=1}^{N_{UE}} H_i^H G_{i(m+1)}^H G_{i(m+1)} H_i \quad \text{(Equation 12)}$$

b) Set $v_{(m+1)}=(v_{max}+v_{min})/2$
c) Compute the following quantity $$\hat{\beta} = \sum_{n_{TX}=1}^{\mu_{TX}} \frac{\lambda_{n_{TX}(m+1)}}{(\lambda_{n_{TX}(m+1)} + \upsilon_{(m+1)})^2}$$

d) Check if $\hat{\beta}>\beta$ then set $v_{min}=v_{(m+1)}$ otherwise set $v_{max}=v_{(m+1)}$
e) Repeat step b), step c) and step d) until $|\hat{\beta}-\beta|<\epsilon_L$.

When the difference E is less than the threshold $\epsilon$, $F_i(m+1)$, i=1, ..., $N_{UE}$ is output in step 940.

The subsets are described above as each including four antennae 315. The person skilled in the art will, however, readily appreciate that the subsets may include any suitable number of antennae, including a plurality of antennae and a single antenna.

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the phrases "in one embodiment" or "in an embodiment" appearing in various places throughout this specification do not necessarily all refer to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

Additionally, it is obvious that the present invention is not limited by the above exemplary embodiments but various modifications can be made thereto without departing from the scope of the already mentioned present invention. For example, the above exemplary embodiments explained that the present invention is a hardware configuration, but the present invention is not limited to this. The present invention can also be realized by causing a CPU (Central Processing Unit) to execute arbitrary processes on a computer program. In this case, the program can be stored and provided to a computer using any type of non-transitory computer readable media.

Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

This application is based upon and claims the benefit of priority from Australian Provisional Patent Application No. 2014902280, filed on Jun. 16, 2014, the disclosure of which is incorporated herein in its entirety by reference.

REFERENCE SIGNS LIST

R0 antenna
R1 receiver antenna
R receiver
T0, T1, T2 transmitter antennae
T transmitter
300 MU-MIMO wireless communication system
305 eNodeB
310 UE
315 antennae
400 message flow diagram
405 downlink (DL) data
410 uplink (UL) channel information (CI)
500 two-dimensional (2D) antenna array
700*a*, 700*b*, 700*c* example partition
705 subset

What is claimed is:
1. A method of data communication in a Multiple-Input and Multiple-Output (MIMO) system, the MIMO system including a base station comprising a plurality of antennae, and a plurality of user equipments (UEs), the method including:
receiving, from a first UE of the plurality of UEs, first channel information relating to a first subset of the plurality of antennae;
generating a first sub-precoder according to the first channel information;
receiving, from the first UE, second channel information relating to a second subset of the plurality of antennae;
generating a second sub-precoder according to the second channel information;
generating a precoder using at least the first sub-precoder and the second sub-precoder; and
transmitting data to the first UE using the precoder;
wherein the method further including:
determining one or more representative sub-channels for the first UE according to at least the first and second channel information; and generating a sub-precoder for each of the one or more representative sub-channels.
2. The method of claim 1, wherein each of the first and second channel information comprises pre-coding matrix indicators (PMI).
3. The method of claim 1, wherein the MIMO system comprises a Multi-user Multiple-Input and Multiple-Output (MU-MIMO) system.
4. The method of claim 1, wherein the antennae are partitioned into a plurality of subsets, wherein the plurality of subsets includes the first subset and the second sub set.
5. The method of claim 1, wherein the representative sub-channels are determined according to a rank indicator (RI) of the first UE.
6. The method of claim 1, wherein the representative sub-channels $\hat{H}_i$ are determined according to the following equation:

$$\hat{H}_i=\hat{H}(m^*)\epsilon\Omega_{RI}, \ i=1, \ldots, N_{UE}$$

where $$m^* = \underset{m}{\mathrm{argmax}}\, tr\left\{\left[\hat{H}(m)W_i\right]^H \left[\hat{H}(m)W_i\right]\right\},$$

$\hat{H}(m) \in \Omega_{RJ}$ and $\Omega_{RJ}$ contains matrices $\hat{H}(m)$, m=1, ... of size $N_{RX} \times \mu_{TX}$ when the rank of the first UE is equal to a number of receiver antennae of the first UE.

7. The method of claim 1, wherein the representative sub-channels are determined by calculating correlation values for a plurality of sub-channels, and selecting the representative sub-channels based upon the correlation values.

8. The method of claim 1, further comprising determining a sub-transmit-power of the first UE, and determining the sub-precoders associated with the first UE according to sub-transmit power.

9. The method of claim 1, wherein the sub-precoders are generated using joint transmit and receive optimization according to at least the first and second channel information.

10. The method of claim 1, wherein the sub-precoders $F_{i(m)}$ are generated iteratively over m according to the following equation:

$$F_{i(m+1)} = \left[\sum_{i=1}^{N_{UF}} H_i^H G_{i(m)}^H G_{i(m)} H_i + v_{(m)} I\right]^{-1} H_i^H G_{i(m)}^H,$$

where $G_{i(m)}$ is a decoder of the i-th user, H(i) is a channel matrix, I is the identity matrix, and $v_{(m)}$ is a Lagrangian multiplier.

11. The method of claim 10, wherein the Lagrangian multiplier $v_{(m)}$ is calculated by:
a) Computing $\lambda_{n_{TX}(m+1)}$ as the singular values of the following decomposition:

$$U_{(m+1)} \Lambda_{(m+1)} U_{(m+1)} = \sum_{i=1}^{N_{UE}} H_i^H G_{i(m+1)}^H G_{i(m+1)} H_i;$$

b) Setting $v_{(m+1)} = (v_{max} + v_{min})/2$;
c) Computing the following quantity $$\hat{\beta} = \sum_{n_{TX}=1}^{\mu_{TX}} \frac{\lambda_{n_{TX}(m+1)}}{(\lambda_{n_{TX}(m+1)} + v_{(m+1)})^2}$$

d) determining if $\hat{\beta} > \beta$ then set $v_{min} = v_{(m+1)}$ otherwise set $v_{max} = v_{(m+1)}$; and
e) Repeating steps b), c) and d) until $|\hat{\beta} - \beta| < \epsilon_L$.

12. The method of claim 1, further comprising estimating a noise variance for the UE, and generating the sub-precoder according to the noise variance.

13. The method of claim 12, wherein the noise variance $\sigma_i^2$ is determined according to the following equation:

$$\sigma_i^2 = \frac{P/N_{UE}}{\sum_{i=1}^{L_i} SINR_{il}/L_i}, i = 1, \ldots, N_{UE}$$

where $L_i$ is the number of code words used for the i-th UE, P is the transmit power, and $SINR_{il}$ is the signal-to-interference-plus-noise ratio.

14. The method of claim 1, wherein generating the precoder comprises stacking the sub-precoders.

15. The method of claim 1, wherein the plurality of antennae comprise a 4×4 array of antennae.

16. The method of claim 15, wherein the 4×4 array of antennae is partitioned into 4 subsets of 4 antennae.

17. The method of claim 1, further including:
receiving, from a second UE of the plurality of UEs, third channel information relating to the first subset of the plurality of antennae;
generating a third sub-precoder according to the third channel information;
receiving, from the second UE, fourth channel information relating to a second subset of the plurality of antennae;
generating a fourth sub-precoder according to the second channel information;
generating a second precoder according at least in part to the third sub-precoder and the fourth sub-precoder; and
transmitting second data to the second UE using the second precoder.

18. A non-transitory computer readable medium storing a control program for causing a computer to perform a process of controlling the base station of claim 1.

19. A MIMO base station comprising a plurality of antennae, at least one memory storing instructions and a processor configured to execute the instructions to:
receive, from a first UE of the plurality of UEs, first channel information relating to a first subset of the plurality of antennae;
generate a first sub-precoder according to the first channel information;
receive, from the first UE, second channel information relating to a second subset of the plurality of antennae;
generate a second sub-precoder according to the second channel information;
generate a precoder according at least in part to the first sub-precoder and the second sub-precoder; and
transmit data to the first UE using the precoder;
wherein the processor further configured to execute the instructions to:
determines one or more representative sub-channels for the first UE according to at least the first and second channel information; and generating a sub-precoder for each of the one or more representative sub-channels.

* * * * *